United States Patent
McClintock et al.

(10) Patent No.: US 10,392,574 B2
(45) Date of Patent: Aug. 27, 2019

(54) CHARGE CARBON BRIQUETTE FOR ELECTRIC ARC STEELMAKING FURNACE

(71) Applicant: Kimmel's Metallurgical Products LLC, Marco Island, FL (US)

(72) Inventors: Willard K. McClintock, Union, KY (US); Willard K. McClintock, Jr., Florence, IN (US); John D. Shoue, Ronan, IN (US)

(73) Assignee: Kimmel's Metallurgical Products LLC, Marco Island, FL (US)

(*) Notice: Subject to any disclaimer, the term of this patent is extended or adjusted under 35 U.S.C. 154(b) by 0 days.

(21) Appl. No.: 15/665,794

(22) Filed: Aug. 1, 2017

(65) Prior Publication Data
US 2018/0037834 A1 Feb. 8, 2018

Related U.S. Application Data

(60) Provisional application No. 62/371,435, filed on Aug. 5, 2016.

(51) Int. Cl.
| | |
|---|---|
| *C10L 5/02* | (2006.01) |
| *C22B 7/02* | (2006.01) |
| *C22B 1/242* | (2006.01) |
| *C10L 5/14* | (2006.01) |
| *C10L 5/40* | (2006.01) |
| *C22B 1/245* | (2006.01) |
| *C10L 5/12* | (2006.01) |

(Continued)

(52) U.S. Cl.
CPC ......... *C10L 5/02* (2013.01); *C10L 5/12* (2013.01); *C10L 5/14* (2013.01); *C10L 5/361* (2013.01); *C10L 5/40* (2013.01); *C21C 5/527* (2013.01); *C21C 5/5217* (2013.01); *C22B 1/242* (2013.01); *C22B 1/245* (2013.01); *C22B 7/02* (2013.01); *C10L 2200/029* (2013.01); *C10L 2200/0213* (2013.01); *C10L 2200/0222* (2013.01); *C10L 2200/0254* (2013.01); *C10L 2290/30* (2013.01); *Y02E 50/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,437,474 A | * | 4/1969 | Imperato | C22B 1/242 75/771 |
| 2010/0154296 A1 | * | 6/2010 | Malhotra | B30B 15/308 44/590 |

* cited by examiner

*Primary Examiner* — Ellen M McAvoy
*Assistant Examiner* — Chantel L Graham
(74) *Attorney, Agent, or Firm* — John M. Hammond; Patent Innovations LLC

(57) ABSTRACT

A method of introducing carbon to an Electric Arc Furnace (EAF) used for melting steel, and a composition of matter including carbon, and made in a briquette form. The composition comprises between 45 and 96 weight percent of a carbon-containing material, between 2 and 30 weight percent of a basic oxide, and between 2 and 25 weight percent of a binder material. The method comprises mixing between 45 and 96 weight percent of a carbon-containing material, between 2 and 30 weight percent of a basic oxide, and between 2 and 25 weight percent of a binder material to form a solid material mixture; compressing individual portions of the solid material mixture into compressed briquettes; curing the compressed briquettes into solid briquettes; and adding the solid briquettes into the molten steel in the electric arc steelmaking furnace.

15 Claims, 1 Drawing Sheet

(51) Int. Cl.
*C10L 5/36* (2006.01)
*C21C 5/52* (2006.01)

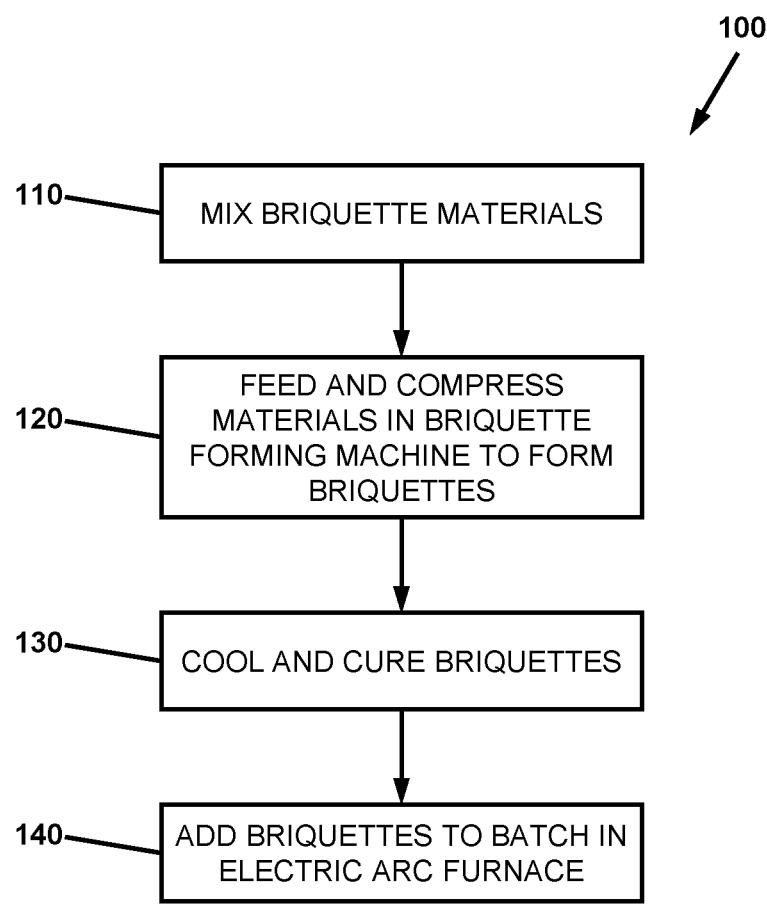

CHARGE CARBON BRIQUETTE FOR ELECTRIC ARC STEELMAKING FURNACE

CROSS-REFERENCE TO RELATED PATENT APPLICATIONS

This application claims priority from U.S. Provisional Patent Application No. 62/371,435, filed Aug. 5, 2016, the disclosure of which is incorporated herein by reference.

BACKGROUND

Technical Field

A method of introducing carbon to an Electric Arc Furnace (EAF) used for melting steel, and a composition of matter including carbon, and made in a briquette form.

Description of Related Art

In the recycling of scrap steel, an EAF is typically used to produce liquid steel. The charge materials, i.e. the materials added to the furnace, typically include the scrap steel, a source of calcium oxide, a source of magnesium oxide, and a source of carbon. The carbon is typically added in two ways. The first is charge carbon, where lump or particulate materials containing carbon are added to the charge that enters the furnace. The second is injected carbon, where carbon-containing particulate is injected into the liquid steel or slag later in the melting process.

As known in the art, the efficiency of the dissolution of charge carbon into the melted steel is very low. In many cases, the charge carbon is considered sacrificial, merely protecting the scrap from oxidation prior to melting. Little carbon survives long enough to dissolve into the liquid steel. That is one reason why there has been a trend in the steel industry to use more injection carbon and less charge carbon in the process. However, charge carbon is typically less expensive than injection carbon materials, so this trend has come at increased processing cost.

One source of charge carbon comes from processing anthracite and other lump carbon materials. During processing, a significant quantity of fine material is produced. This undersized material has been bagged or compacted and used for charge carbon. Since it is a byproduct, the cost is comparatively low. However, as noted previously, the efficiency of the dissolution of this charge carbon into the melted steel in the EAF is very low. Moreover, as this form of charge carbon is added to the furnace, the fine material can be entrained in the flowing gases above the melted steel and exhausted by the fume control system in the EAF. Under such circumstances, the charge carbon fines can burn exothermically to produce CO and $CO_2$ gases. This combustion of carbon in the off-gas system of the EAF can be problematic and also may pose a safety hazard. In an attempt to alleviate this problem, the fine carbon materials have been formed into compact briquettes under pressure. However, the briquette material of the current art has low structural integrity and is easily fractured, is low in density, and is only marginally better for recovery of the contained carbon, i.e. the amount of elemental carbon contained in the charge carbon material.

A costly side effect of low recovery of charge carbon is iron yield loss. Most carbon-containing materials that are used for charge carbon contain some oxide material generally referred to in the art as ash. Ash is comprised mostly of silicon oxide with some aluminum and other metal oxides. These oxides are acidic with respect to the basic slag that is optimal for steel production in the EAF. Thus, with each unit of charge carbon addition containing ash, there must be corresponding units of calcium and magnesium oxides added to maintain the desired chemical composition and basicity of the slag. There is a given percentage of iron oxide in steelmaking slag that is in equilibrium with the oxygen activity in the steel bath. This iron oxide is contributed mostly by iron that is oxidized from the steel bath, so it represents a yield loss. The yield loss is proportional to the slag amount, so the ash contained in the charge carbon and the corresponding offsetting additions of ash add to the slag amount, thereby increasing yield loss. The lower the efficiency of the carbon in dissolving into the melted steel, the more carbon-containing material is required, and the more ash is contributed to the slag. Typically, the carbon efficiency of charge carbon is reported as 12 to 50 percent, i.e., 12-50 percent of the charge carbon becomes dissolved in the melted steel. A significant yield increase could be realized if the efficiency of dissolution of carbon into the melted steel were increased. Accordingly, there is a need for an improved form of charge carbon and an improved composition of matter that contains carbon, and that dissolves more efficiently into the melted steel in an electric arc furnace for making steel.

SUMMARY

The present invention meets this need by providing a composition of matter containing carbon provided in briquette form. The carbon-containing briquettes enable more efficient introduction of carbon to an Electric Arc Furnace (EAF) used for melting steel. In one aspect of the invention, the briquette is comprised of a carbon source, a binder, and a source of calcium oxide and/or magnesium oxide. The briquette has properties which greatly increase the efficiency of introduction of carbon in the EAF and which prevents the loss of carbon by oxidation prior to entry into the liquid steel bath. The briquette formed according to a method of the present invention has high density, which results in high carbon recovery when added as charge carbon to the EAF. Advantageously, this enables the use of low cost undersized materials to be compacted and used with high efficiency as charge carbon in the EAF, and also enables an increase in the yield of iron from scrap melted in the EAF. Yet another advantage of the briquette composition and method of the present invention is that they reduce the amount of carbon oxides exhausted in the EAF off gas, thereby also reducing the heat load in the off gas system components.

More particularly, in accordance with the present disclosure, a material composition formed as a solid briquette is provided. The composition comprises between 80 and 95 weight percent of a carbon-containing material, between 2 and 10 weight percent of a basic oxide, and between 2 and 12 weight percent of a binder material. The carbon-containing material of the composition may be selected from coke, coke breeze, anthracite, anthracite fines, coal, coal fines, or combinations thereof. The basic oxide of the composition may include calcium oxide and magnesium oxide. The binder material of the composition may be selected from the group consisting of molasses, brewers' yeast, bentonite, industrial byproduct hydrocarbon binder material, and combinations thereof. The solid briquette may have a density of at least 120 lb/cubic foot. The Applicants have discovered that advantageously, the contained carbon in the charge carbon briquette of the present disclosure is protected from adverse reaction by virtue of its composition. The contained carbon is not wasted prior to dissolution due to the protection offered by the coating produced in situ on the briquette, as is described subsequently herein.

Also according to the present disclosure, a method of introducing carbon into an electric arc furnace for making steel is provided. The method comprises mixing between 80 and 95 weight percent of a carbon-containing material, between 2 and 10 weight percent of a basic oxide, and between 2 and 12 weight percent of a binder material to form a solid material mixture; compressing individual portions of the solid material mixture into compressed briquettes; curing the compressed briquettes into solid briquettes; and adding the solid briquettes into the molten steel in the electric arc steelmaking furnace.

The solid briquettes include respective exterior surfaces. The method may further comprise oxidizing the briquette surfaces, and causing sealing of the solid briquette surfaces by formation of a calcium magnesium silicon oxide coating. The method may further comprise causing at least 90 weight percent of the carbon in the solid briquettes to dissolve into the molten steel.

BRIEF DESCRIPTION OF THE DRAWINGS

The present disclosure will be provided with reference to the following drawings, in which like numerals refer to like elements, and in which:

FIG. 1 is a flowchart depicting a method of making carbon-containing briquettes of the present disclosure, and using the briquettes to introduce charge carbon into an electric arc furnace for steelmaking.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

FIG. 1 is a flowchart depicting a method 100 of making carbon-containing briquettes of the present disclosure, and using the briquettes to introduce charge carbon into an electric arc furnace for steelmaking.

The fabrication of the briquettes begins with mixing 110 of briquette materials. The briquette materials include carbon-containing materials, calcium oxide (CaO), magnesium oxide (MgO), and a binder material. In certain embodiments, the composition of the briquettes may be between 45 and 96 weight percent of a carbon-containing material, between 2 and 30 weight percent of a basic oxide, and between 2 and 25 weight percent of a binder material. In certain preferred embodiments, the composition of the briquettes may be between 78 and 94 weight percent of a carbon-containing material, between 3 and 10 weight percent of a basic oxide, and between 3 and 12 weight percent of a binder material.

The carbon-containing material may be sourced from industrial byproduct carbon sources, coke, coke breeze, anthracite, anthracite fines, coal, coal fines, or combinations thereof. The carbon-containing material may have a wide range of particle sizes, ranging from a maximum of 12 mm in diameter (or other characteristic dimension, as not all particles are spherical), down to about 0.025 mm (i.e. particles retained by a 500 mesh screen) and is more than 50% carbon by weight. The basic oxide containing material includes at least 50 weight percent CaO, and additionally, MgO, either in oxide form or present as carbonates or hydroxides. The binder material is selected from the group consisting of molasses, brewers' yeast, bentonite, industrial byproduct hydrocarbon binder material, and combinations thereof. One exemplary industrial byproduct hydrocarbon binder material is coal tar pitch. The binder material is intended to aid in briquette formation.

The briquette materials are mixed 110 in a suitable dry solids mixing apparatus. The mixed briquette materials are then fed into and compressed 120 in a briquette forming machine. In executing the compression of the materials into individual briquettes, it has been observed that the process is exothermic, i.e. heat is generated.

The briquettes are then allowed to cool 130 to ambient temperature. The cooling may occur relatively slowly, such as over a 24 hour period, during which time the briquettes may increase in density and/or increase in structural strength and stability, thereby increasing their resistance to breakage. The Applicants have discovered that relatively slow cooling and curing over a 24 hour period improves structural strength. Without wishing to be bound to any particular theory, the applicants believe that the curing is likely pozzolanic in nature, similar to the curing of concrete. The briquettes are then added 140 to a steelmaking batch in an electric arc furnace.

Advantageously, briquettes of the present disclosure having the recited composition and made according to the recited method have a higher carbon efficiency in charge carbon added to the EAF. This is illustrated by the EXAMPLE recited below as follows.

Example

An exemplary batch of briquettes was formulated by blending 86 weight percent coke and anthracite fines with a particle size range from 4 mm down to about 0.037 mm (particles retained by a 400 mesh screen), 6 weight percent lime, and 8 weight percent molasses. The constituents were blended into a mixture of uniform consistency.

The mixture was then fed to a 150 ton Model DH400 briquetting and compacting roll press briquette forming machine manufactured by K. R. Komarek Inc. of Wood Dale, Ill. After the briquettes were formed, they were allowed to set for 24 hours to cure and become physically stable. It is noted that the lime that was included in the briquette composition was hydrophilic. The Applicants believe that the lime was thus effective in absorbing some of the moisture in the mixture to form calcium hydroxide, which aided in the briquette formation. A single briquette made according to this example had a curvilinear shape, roughly square perpendicular to a central axis, and about 60 mm on a side, and with a thickness of about 30 mm along the central axis. Briquettes varied slightly in size after curing.

A 120 ton EAF was top charged with scrap and 3500 lbs. of conventional charge carbon material containing 85 weight percent carbon. After melting the steel, the chemistry analysis showed that carbon content was 0.08 weight percent. That batch of steel was tapped from the furnace. Subsequently, another charge was made in this furnace using 2000 lbs. of the exemplary briquettes as described above, in place of the conventional charge carbon. The carbon content of the exemplary briquettes was 65 weight percent.

After melting the steel, the chemistry analysis showed that carbon content was 0.11%. Therefore, with much less weight of carbon added, the carbon content of the steel was higher. Although the unit cost of the briquette charge carbon was higher, much less of it was used than the conventional charge carbon, therefore lowering the overall cost.

The carbon-containing briquettes made as described herein have numerous advantages as a charge carbon source for use in EAF steel production, as compared to conventional charge carbon sources:

1) The briquettes are of relatively high density, so a smaller volume is required for a given weight added to accomplish the desired introduction of carbon into the melted steel. Typical charge carbon briquette density is 55 lb per cubic foot; the briquettes of the present invention have average density of 120 lb per cubic foot.

2) The briquettes have good strength and are physically stable. A drop test from 20 feet onto concrete was performed on an exemplary briquette in order to test physical strength and stability. 80% of the briquettes tested did not fracture, and of the 20% that fractured, about 75% of the briquette remained intact.

3) In one exemplary embodiment, briquettes made according to the present disclosure were used as charge carbon in continuously fed electric arc Consteel® furnace manufactured by the Tenova Core Company of Pittsburgh Pa. Typically, the residence time at high temperature in such a furnace is long enough to completely oxidize charge carbon sources. However, the present briquettes unexpectedly experienced only surface oxidation, which is a surprisingly different result as compared to briquettes made with prior known compositions and methods. The effective protection of the remaining contained carbon in the briquettes was unexpected, and to the best of the Applicant's knowledge, has not been observed in briquettes of the prior art. Without wishing to be bound to any particular theory, the Applicants believe that the surfaces of the briquettes were effectively sealed by a calcium magnesium silicon oxide coating when immersed in the molten steel bath. Over 90 weight percent of the carbon contained in the present briquettes was recovered in, i.e., dissolved into, the steel bath. This is a major increase in carbon efficiency over charge carbon sources of the prior art.

4) In one exemplary embodiment, briquettes made according to the present disclosure were used as charge carbon to top charged EAF. Based on steel chemistry analysis, it was determined that 95 weight percent of the contained carbon was recovered in the steel bath. Typical charge carbon recovery ranges from 0 to 50 weight percent depending on the process and on the material. Therefore, the recovery of carbon from the present briquettes was almost double the best recovery known in the art.

5) Higher carbon recovery as described above results in a lower charge carbon addition rate per ton of steel yielded, thereby saving cost in steel manufacturing.

6) Charge carbon sources contain sulfur, which is detrimental to the steel making process and usually must be removed in secondary processing. Less required charge carbon addition due to the higher carbon recovery of the present briquettes results in less sulfur added to the steel, thus saving sulfur removal costs.

7) Higher carbon recovery also results in less carbon being oxidized to CO and $CO_2$ so there is lower volumetric and thermal load on the off gas system of the EAF.

It is therefore apparent that there has been provided, in accordance with the present disclosure, a method of introducing carbon to an electric arc furnace used for melting steel, and making a composition of matter including carbon in a briquette form. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom.

The headings in this disclosure (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The description and specific examples, while indicating embodiments of the technology disclosed herein, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

To the extent employed herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the words "comprise," "include," "contain," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting ingredients, components or process steps, the Applicants specifically envision embodiments consisting of, or consisting essentially of, such ingredients, components or processes excluding additional ingredients, components or processes (for consisting of) and excluding additional ingredients, components or processes affecting the novel properties of the embodiment (for consisting essentially of), even though such additional ingredients, components or processes are not explicitly recited in this application. For example, recitation of a composition or process reciting elements A, B, and C specifically envisions embodiments consisting of, and consisting essentially of, A, B, and C, excluding an element D that may be recited in the art, even though element D is not explicitly described as being excluded herein.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

We claim:

1. A non-homogeneous material composition comprising between 45 and 96 weight percent of a carbon-containing material, between 2 and 30 weight percent of calcium oxide and magnesium oxide, and between 2 and 25 weight percent of a binder material; and comprising an external surface layer of calcium magnesium silicon oxide surrounding a volume of the material composition.

2. The composition of claim 1, wherein the carbon-containing material is selected from coke, coke breeze, anthracite, anthracite fines, coal, coal fines, or combinations thereof.

3. The composition of claim 1, wherein the binder material is selected from the group consisting of molasses, brewers' yeast, bentonite, industrial byproduct hydrocarbon binder material, and combinations thereof.

4. A solid briquette comprising an external surface layer of calcium magnesium silicon oxide, and a total composition of between 45 and 96 weight percent of a carbon-containing material, between 2 and 30 weight percent of calcium oxide and magnesium oxide, and between 2 and 25 weight percent of a binder material.

5. The composition of claim 1, comprising between 78 and 94 weight percent of the carbon-containing material, between 3 and 10 weight percent of the calcium oxide and magnesium oxide, and between 3 and 12 weight percent of the binder material.

6. A method of introducing carbon into molten steel in an electric arc steelmaking furnace, the method comprising:
   a) mixing between 45 and 96 weight percent of a carbon-containing material, between 2 and 30 weight percent of a basic oxide, and between 2 and 25 weight percent of a binder material to form a solid material mixture;
   b) compressing individual portions of the solid material mixture into compressed briquettes;
   c) curing the compressed briquettes into solid briquettes; and
   d) adding the solid briquettes into the molten steel in the electric arc steelmaking furnace.

7. The method of claim 6, wherein the solid briquettes include respective exterior surfaces, and the method further comprises oxidizing the briquette surfaces.

8. The method of claim 7, further comprising causing sealing of the solid briquette surfaces.

9. The method of claim 8, wherein the sealing of the solid briquette surfaces is caused by formation of a calcium magnesium silicon oxide coating.

10. The method of claim 6, further comprising causing at least 90 weight percent of the carbon in the solid briquettes to dissolve into the molten steel.

11. The method of claim 6, comprising mixing between 78 and 94 weight percent of the carbon-containing material, between 3 and 10 weight percent of the basic oxide, and between 3 and 12 weight percent of the binder material to form the solid material mixture.

12. The composition of claim 4, wherein the solid briquette has a density of at least 120 lb/cubic foot.

13. The briquette of claim 4, wherein the carbon-containing material is selected from coke, coke breeze, anthracite, anthracite fines, coal, coal fines, or combinations thereof.

14. The briquette of claim 4, wherein the binder material is selected from the group consisting of molasses, brewers' yeast, bentonite, industrial byproduct hydrocarbon binder material, and combinations thereof.

15. The briquette of claim 4, comprising between 78 and 94 weight percent of the carbon-containing material, between 3 and 10 weight percent of the calcium oxide and magnesium oxide, and between 3 and 12 weight percent of the binder material.

* * * * *